United States Patent
Zhuang et al.

(10) Patent No.: US 12,494,908 B2
(45) Date of Patent: Dec. 9, 2025

(54) METHOD FOR DATA ENCRYPTION, TERMINAL DEVICE AND NON-TRANSITORY COMPUTER-READABLE STORAGE MEDIUM

(71) Applicant: SHENZHEN MINEW TECHNOLOGIES CO LTD, Guangdong (CN)

(72) Inventors: Yan Zhuang, Guangdong (CN); Hulin Chen, Guangdong (CN)

(73) Assignee: SHENZHEN MINEW TECHNOLOGIES CO LTD, Guangdong (CN)

( * ) Notice: Subject to any disclaimer, the term of this patent is extended or adjusted under 35 U.S.C. 154(b) by 125 days.

(21) Appl. No.: 18/522,924

(22) Filed: Nov. 29, 2023

(65) Prior Publication Data
US 2024/0178999 A1     May 30, 2024

(30) Foreign Application Priority Data
Nov. 29, 2022 (CN) .......................... 202211509004.3

(51) Int. Cl.
    *H04L 9/08*        (2006.01)
    *H04L 9/14*        (2006.01)

(52) U.S. Cl.
    CPC .............. *H04L 9/0869* (2013.01); *H04L 9/14* (2013.01)

(58) Field of Classification Search
    USPC ......................................................... 380/46
    See application file for complete search history.

(56) References Cited

U.S. PATENT DOCUMENTS

| | | | |
|---|---|---|---|
| 8,694,798 B2 * | 4/2014 | Schneider | G06F 21/6209 713/193 |
| 2004/0203591 A1 * | 10/2004 | Lee | H04L 9/0662 455/410 |

(Continued)

FOREIGN PATENT DOCUMENTS

| | | | |
|---|---|---|---|
| CN | 106788982 A | 5/2017 | |
| CN | 106850220 A | 6/2017 | |

(Continued)

OTHER PUBLICATIONS

Chinese First Office Action corresponding to CN Application No. 202211509004.3; Issue date, May 28, 2025, 16 pages.

*Primary Examiner* — Sanchit K Sarker
(74) *Attorney, Agent, or Firm* — CANTOR COLBURN LLP (57) ABSTRACT

A method for data encryption, a terminal device, and a computer-readable storage medium. The method includes: obtaining data to be encrypted, where the data to be encrypted includes a plurality of character strings obtained by dividing the data to be encrypted according to a first target position; extracting an initial random number according to a target character string of the plurality of character strings; generating a plurality of keys used for the plurality of character strings according to the initial random number and a plurality of key generation strategies, where the plurality of character strings correspond to the plurality of key generation strategies, respectively; and using the plurality of keys used for the plurality of character strings to encrypt the plurality of character strings respectively to obtain target encrypted data. According to the embodiments of the present disclosure, the security of encrypted data may be improved.

13 Claims, 4 Drawing Sheets

S201
Exchanging a numerical value at the first preset position in the initial random number with a numerical value at a second preset position in the initial random number to obtain an obfuscated random number;

S202
Selecting a preset number of bits from the obfuscated random number, and concatenating the selected number of bits with the obfuscated random number to obtain a key for a first character string in the plurality of character strings (56) References Cited

U.S. PATENT DOCUMENTS

2021/0409195 A1* 12/2021 Kim ...................... H04L 9/0869
2022/0069984 A1* 3/2022 Ahn ......................... H04L 9/14

FOREIGN PATENT DOCUMENTS

| CN | 110061840 A | | 7/2019 | |
|----|-------------|---|--------|----------|
| CN | 113014604 A | | 6/2021 | |
| CN | 114528575 A | * | 5/2022 | ........... G06F 21/602 |

* cited by examiner

METHOD FOR DATA ENCRYPTION, TERMINAL DEVICE AND NON-TRANSITORY COMPUTER-READABLE STORAGE MEDIUM

CROSS-REFERENCE TO RELATED APPLICATION

Pursuant to 35 U.S.C. § 119 and the Paris Conversion, this application claims the benefit of Chinese Patent Application No. 202211509004.3, filed on Nov. 29, 2022, and entitled "method and apparatus for data transmission, terminal device and computer-readable storage medium", the entire contents of which are incorporated herein by reference.

TECHNICAL FIELD

The present disclosure relates to the field of data processing technologies, and more particularly, to a method for data transmission a terminal device and a non-transitory computer-readable storage medium.

BACKGROUND

The statements provided herein are merely background information related to the present disclosure, and do not necessarily constitute any prior arts. Data encryption is the most reliable approach for protecting information through a computer system. In the related art, a method for data encryption generally includes converting a data to be encrypted into encrypted data through an encryption algorithm and an encryption key, and a method for data decryption includes decrypting the encrypted data into the data to be encrypted through a decryption algorithm and a decryption key. However, the key still have a problem of key leakage. Once the key is compromised, encrypted data which is obtained by encrypting based on the key and common encryption algorithm such as MD5 message-digest algorithm (MD5) and a data encryption standard (DES) is prone to be compromised, and the security of the encrypted data is relatively lower.

SUMMARY

Embodiments of the present disclosure provide a method and an apparatus for data encryption, a terminal device and a storage medium, which can solve the problem of lower safety of encrypted data in the related art.

A method for data encryption is provided according to the first aspect of the embodiments of the present disclosure. The method includes: obtaining data to be encrypted, the data to be encrypted includes a plurality of character strings obtained by dividing the data to be encrypted according to a first target position: extracting an initial random number from a target character string of the plurality of character strings: generating a plurality of keys used for the plurality of character strings according to the initial random number and a plurality of key generation strategies, the plurality of character strings correspond to the plurality of key generation strategies, respectively: and encrypting the plurality of character strings by the plurality of keys used for the plurality of character strings respectively to obtain target encrypted data.

A terminal device is provided according to the second aspect of the embodiments of the present disclosure. The terminal device includes: a memory, a processor and a computer program stored in the memory and executable by the processor, the processor is configured to, when executing the computer program, implement the steps of the method for data encryption.

A non-transitory computer-readable storage medium is provided according to the third aspect of the present disclosure. The non-transitory computer-readable storage medium stores a computer program, that, when executed by a processor, causes the processor to implement the aforesaid method for data encryption.

A computer program product is further provided according to the fourth aspect of the present disclosure. The computer program product is configured to, when executed by a terminal device, causes the terminal device to perform the aforesaid method for data encryption in the first aspect.

In the embodiments of the present disclosure, the data to be encrypted is obtained, the plurality of character strings are obtained by dividing the data to be encrypted according to the first target position, and the initial random number is extracted from the target character string of the plurality of character strings. Then, the keys used for the plurality of character strings are generated according to the initial random number and the plurality of key generation strategies, the corresponding character strings are encrypted according to the keys used for the plurality of character strings respectively, and thus the target encrypted data is obtained. In this way, when the target encrypted data is decrypted, the data to be encrypted can be recovered only by obtaining the first target position, the method for extracting the initial random number and the key generation strategies used for different character strings. In one aspect, it is more difficult to obtain the key. In another aspect, it is still difficult to recover the data to be encrypted from the decrypted data even if the key is compromised, in the event that the first target position cannot be obtained. Thus, the method for data encryption in accordance with the present disclosure has a higher security.

DESCRIPTION OF THE DRAWINGS

In order to describe the technical solutions in the embodiments of the present disclosure more clearly, a brief introduction regarding the accompanying drawings that need to be used for describing the embodiments or the existing technologies is given below. It is obvious that the accompanying drawings described below are merely some embodiments of the present disclosure. For a person of ordinary skill in the art, other drawings may also be obtained according to the current drawings without paying creative efforts.

DETAILED DESCRIPTION OF EMBODIMENTS

In order to make the objective, the technical solutions and the advantages of the present disclosure be clearer and more understandable, the present disclosure will be further described in detail below with reference to accompanying figures and the embodiments. It should be understood that, the embodiments described in detail herein are merely intended to illustrate rather than limiting the present disclosure. Based on the embodiments in the present disclosure, other embodiments, which are obtained by the person of ordinary skill in the art at without paying creative labor, should all be included in the protection scope of the present disclosure.

In order to describe the technical solutions of the present disclosure, the technical solutions of the present disclosure are described below with reference to the detailed description of embodiments.

Figure 1:
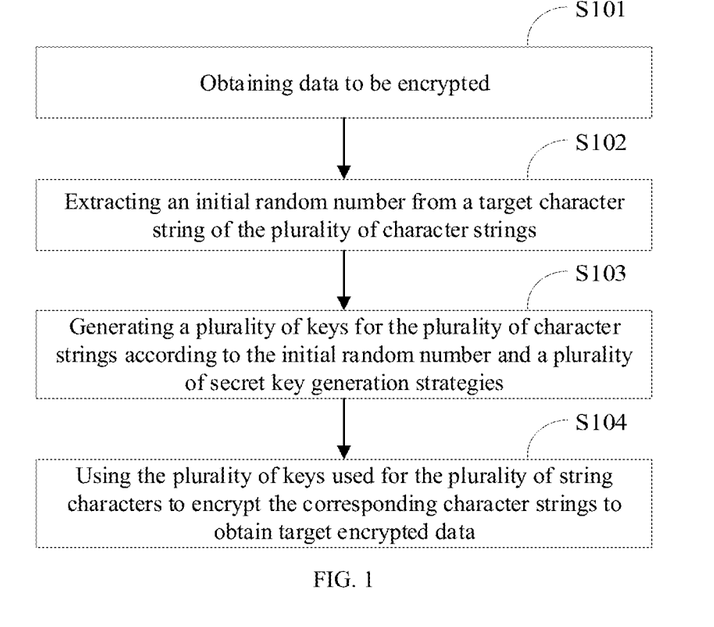
FIG. 1 illustrates a schematic flow diagram of an implementation process of a method for data encryption in accordance with one embodiment of the present disclosure.

FIG. 1 illustrates a schematic diagram of implementation process of a method for data encryption according to one embodiment of the present disclosure. The method may be applied to a terminal device, and may be applicable to a situation in which data security needs to be improved. The terminal device may be a computer, a smart phone, or other smart devices having data encryption requirements.

In particular, the method for data encryption may include steps S101-S104.

In the step of S101, data to be encrypted is obtained.

The data to be encrypted refers to the data that needs to be encrypted, for example, the data to be encrypted may refer to service data, device operation data that need to be encrypted. In this embodiment of the present disclosure, the data to be encrypted may include a plurality of character strings obtained by dividing the data to be encrypted according to first target position(s). The number of the first target position(s) may be one or plural, each of the first target position(s) may be a position preset by a user according to the actual situation.

In particular, when the number of the first target position(s) is one, since the data to be encrypted is a string of complete character string, the complete character string is divided into two parts at the first target position, and two character strings may be obtained. When the number of the first target position(s) is plural, the complete character string is sequentially divided at the plurality of first target positions, so that a plurality of character strings may be obtained.

In some embodiments, the first target position may be a preset number of bytes. Taking the first target position as a Nth byte as an example, the terminal device may use the first N bytes of the data to be encrypted as a character string, and use bytes from a (N+1)th byte of the data to be encrypted to the last byte of the data to be encrypted as another character string. Thus, two character strings are obtained. N is a positive integer greater than or equal to 1. For example, the first 2 bytes of the data to be encrypted may be used as one character string, and the remaining bytes of the data to be encrypted are used as another character string.

In a step of S102, an initial random number is extracted from a target character string of a plurality of character strings.

The initial random number is a random number used for generating a key. The terminal device may extract the initial random number from the target character string according to a preset extraction method. The target character string may be any character string in the plurality of character strings.

In some embodiments, the terminal device may extract a numerical value on a preset bit from the first character string to constitute the initial random number. Taking the target character string as the first 2 bytes of the data to be encrypted as an example, the terminal device may use the highest 6 bits of the first byte in the target character string as high 6 bits of the initial random number, and use the highest bit of the second byte in the first 2 bytes as the lowest bit of the initial random number to obtain an initial random number with 7 bits.

In a step of S103, keys used for the plurality of character strings are generated according to the initial random number and a plurality of key generation strategies.

The plurality of character strings correspond to different key generation strategies in the plurality of key generation strategies, respectively. In other words, based on the same initial random number, a plurality of key generation strategies may be adopted to generate a plurality of keys, and each key may be respectively used to encrypt one character string in the plurality of character strings. There is a one-to-one correspondence between the character strings, the key generation strategies, and the keys. For example, the plurality of key generation strategies may include a strategy $A_1$, a strategy $A_2$, the strategy $A_1$ used for the initial random number and a character string $B_1$ may be used to generate a key $C_1$ used for the character string $B_1$, and a strategy $A_2$ used for the initial random number and the character string $B_2$ may be used to generate a key $C_2$ for the character string $B_2$.

In particular, the key generation strategy, that is, the key generation algorithm, may be an encryption algorithm such as MD5 message-digest algorithm (MD5), or be a dedicated key generation algorithm. The key generation strategy is not limited herein.

In a step of S104, the corresponding character strings are encrypted respectively according to the keys used for the plurality of character strings to obtain target encrypted data.

In the embodiments of the present disclosure, after the keys used for the plurality of character strings are obtained, the keys used for the plurality of character strings may be used to encrypt the character strings corresponding to the keys. For example, when a key used for the character string $B_1$ is $C_1$, and a key used for the character string $B_2$ is $C_2$, the key $C_1$ may be used to encrypt the character string $B_1$, and the key $C_2$ may be used to encrypt the character string $B_2$ to obtain the target encrypted data. The target encrypted data is the data obtained by encrypting the data to be encrypted.

In the embodiments of the present disclosure, the data to be encrypted is obtained, the plurality of character strings are obtained by dividing the data to be encrypted according to the first target position, and the initial random number is extracted from the target character string of the plurality of character strings. Then, the keys used for the plurality of character strings are generated according to the initial random number and the plurality of key generation strategies, and the corresponding character strings are encrypted according to the keys used for the plurality of character strings respectively so as to obtain the target encrypted data. Thus, when the target encrypted data is decrypted, the data to be encrypted may be recovered only by obtaining the first target position, the extraction method of the initial random number and the key generation strategies used for different character strings. In one aspect, it is more difficult to obtain the key. In another aspect, it is still difficult to recover the data to be encrypted from the decrypted data even if the key is compromised, in the event that the first target position cannot be obtained. Thus, the method for data encryption in accordance with the present disclosure has a higher security.

The specific implementation process of the method for data encryption in accordance with the present disclosure is described below.

Figure 2:
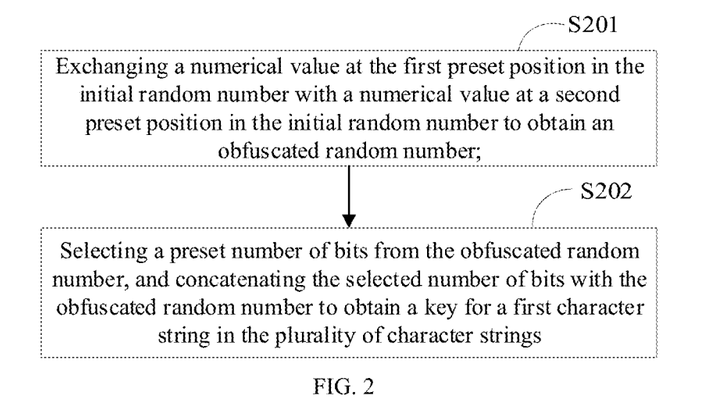
FIG. 2 illustrates a schematic flow diagram of a detailed implementation process of a first key generation strategy in accordance with one embodiment of the present disclosure.

In some implementations, the plurality of key generation strategies may include a first key generation strategy, the first key generation strategy may be used to generate a key for encrypting the first character string, and the first character string is any one of the plurality of character strings. For example, the first character string may refer to the aforesaid target character string.

Referring to FIG. 2, the first key generation strategy may include following steps S201-S202.

In a step of S201, a numerical value at the first preset position of the initial random number is exchanged with a numerical value at the second preset position of the initial random number to obtain the obfuscated random number.

The first preset position and the second preset position may be different bits or different bytes of the initial random number, and the specific values of the first preset position and the second preset position may be adjusted according to actual situation. For example, after the initial random number is obtained, the first bit of bit[1] and the zero bit of bit[0] of the initial random number may be exchanged to obtain the obfuscated random number.

In a step of S202, a preset number of bits are selected from the obfuscated random number, and the selected number of bits is concatenated with the obfuscated random number to obtain a key used for the first character string in the plurality of character strings.

The preset number may be determined according to the length of the key used for the first character string. After the step S201 is performed, the obtained obfuscated random number also has 7 bits. Assuming that the key used for the first character string has 10 bits, 3 bits may be selected from the obfuscated random number, and the selected 3 bits are concatenated with the obfuscated random number. For example, the second bit of bit[2], the fourth bit of bit[4], and the fifth bit of bit[5] of the obfuscated random number may be respectively used as the highest 3 bits of the extended random number, and the obfuscated random number is used as the last 7 bits of the extended random number, so that a 10-bit extended random number is obtained. That is, the extended random number is the key used for the first character string.

Correspondingly, the terminal device may use this key to encrypt the first character string. For example, the present disclosure is further described by taking the first character string as the first 2 bytes of the data to be encrypted as an example, the terminal device may first merge the first 2 bytes into one data having a type of unit16_t, and then encrypt the first character string by performing an Exclusive OR (XOR) operation on the data having the type of unit16_t and the key used for the first character string to obtain encrypted sub-data corresponding to the first character string.

Figure 3:
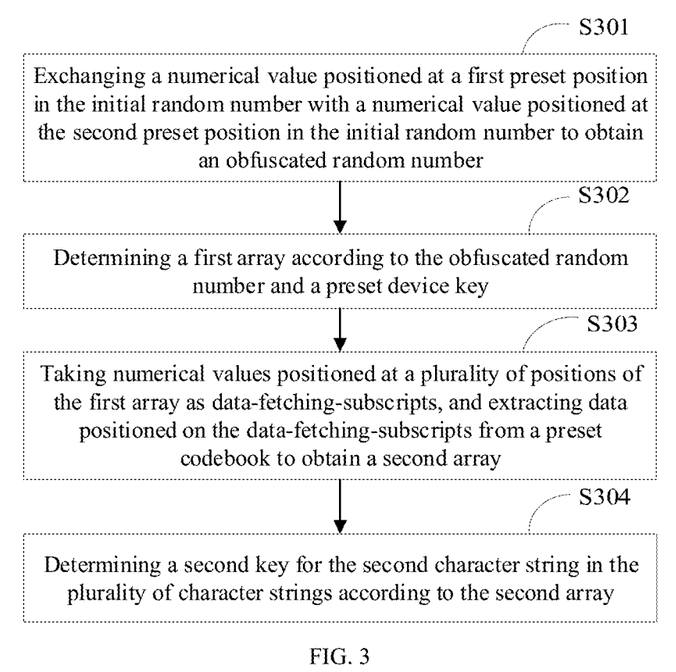
FIG. 3 illustrates a schematic flow diagram of a detailed implementation process of a second key generation strategy in accordance with one embodiment of the present disclosure.

In some other embodiments, the plurality of key generation strategies may include a second key generation strategy, the second key generation strategy may be used to generate a key used for encrypting the second character string. The second character string is any one of the plurality of character strings, and the second character string is a character string different from the first character string.

Referring to FIG. 3, the second key generation strategy may include following steps S301 to S304.

In the step of S301, the numerical value at the first preset position of the initial random number is exchanged with the numerical value at the second preset position of the initial random number to obtain the obfuscated random number.

Regarding the specific implementation of the step S301, reference can be made to the description of the step S201, the specific implementation of the step S301 are not repeatedly described herein.

In a step of S302, a first array is determined according to the obfuscated random number and a preset device key.

The device key is a preset initial key which may be set by the user according to the actual situation. In the related art, the device key is generally and directly used to encrypt the data to be encrypted, thus, leakage of the data to be encrypted is prone to occur after the device key is compromised. However, in this embodiment of the present disclosure, the terminal device needs to process the device key to obtain the second key actually used for encryption. That is, the key used for the character string is obtained by processing based on the device key. Thus, on the premise that the processing method of the key is unknown, it is difficult to recover the data to be encrypted even if the device key is compromised.

In particular, the terminal device may determine the first array according to the obfuscated random number and the preset device key. The first array is a cipher-fetching-array for fetching codes from a codebook.

In some embodiments, the terminal device may determine a first subscript for reordering the device key according to the obfuscated random number. The subscript may also be interpreted as position. The character string(s) positioned before the first subscript in the device key may be moved to the tail of the device key according to the first subscript to implement reordering, and thus the first key data is obtained. In this situation, a second subscript for performing data replacement on the first key data and replacement data for replacing the original data of the first key data may be determined according to the obfuscated random number. Furthermore, the data positioned on the second subscript in the first key data may be replaced with the replacement data to obtain the second key data. Finally, a hash algorithm may be performed on the second key data and the device key, respectively, and the first array may be determined according to result of hash algorithms of the second key data and the device key.

First, the terminal device may extract a value having a preset number of bits from the obfuscated random number and take the value as the first subscript for reordering. For example, the device key may be a key having a length of 16 bytes. The terminal device may take the lowest 4 bits of the obfuscated random number as the first subscript for reordering, and move the data of the device key before the first subscript to the end of the device key to obtain the first key data. For example, the obfuscated random number is mix_rng=0x46, the lowest 4 bits are dk_order=0x06, if the device key org_device_key is {0, 1, 2, 3, 4, 5, 6, 7, 8 . . . , 15}, the reordered first key data is new_device_key: {6, 7, 8, 9, 10 . . . , 1, 2, 3, 4, 5}.

Then, the terminal device may extract a value having a different preset bit number from the obfuscated random number and take the extracted value as the second subscript, and use the obfuscated random number as the replacement data. For example, the highest 4 bits of the obfuscated random number may be used as a basis for data replacement, the high 4-bit of the obfuscated random number is taken as the subscript that indicates the location for data replacement, data at the location of the subscript is replaced with the obfuscated random number. For example, the obfuscated random number is mix_rng=0x46, the highest 4 bits are replace_order=0x04, and the reordered first key data is new_device_key: {6, 7, 8, 9, 10 . . . , 1, 2, 3, 4, 5}, the second key data after data replacement is new_device_key: {6, 7, 8, 9, 0x46 . . . , 1, 2, 3, 4, 5}.

Then, the terminal device may perform hash algorithm on the second key data and the device key, respectively, and concatenate the result of hash algorithm of the second key data with the result of hash algorithm of the device key to obtain the first array. For example, a hash algorithm (such as MD5 operation) is performed on the device key org_device_key (16 bytes) and the second key data new_device_key (16 bytes) to obtain a first array of md5_result_a. The result of hash algorithm obtained by performing the hash algorithm on the second key data new_device_key is used as the high 16 bytes of the first array of md5_result_a, and the result of hash algorithm obtained by performing the hash algorithm on the device key org_device_key is used as the low 16 bytes of the first array of md5_result_a.

In a step of S303, the numerical values at all positions of the first array are taken as data-fetching subscripts, and data positioned on the data-fetching subscripts are fetched from the preset codebook to obtain a second array.

In the embodiments of the present disclosure, a set of data is recorded in the codebook, and values in the set of data are sorted according to a certain order. The numerical values at all positions in the first array are taken as the data-fetching subscripts, the data positioned on the data-fetching subscripts (i.e., the corresponding positions of the codebook) are fetched from the codebook to obtain the second array. The second array is an array used for determining the key.

More specifically, the numerical values on all positions of the first array are taken as the data-fetching subscripts, the numerical values on the data-fetching subscripts are fetched from the numerical values ordered sequentially in the codebook and are taken as the numerical values of the second array that correspond to the positions of the first array, and thus the second array can be obtained. For example, the numerical value of the first bit in the obtained first array of md5_result_a is taken as the subscript for fetching codes from the codebook. Taking the numerical value as 2 as an example, the numerical value of the second bit of the codebook is fetched from the codebook and is stored as the numerical value of the first bit in the second array of md5_result_tmp. Then, the numerical value of the second bit in the obtained first array of md5_result_a is taken as the subscript for fetching codes from the codebook. Taking the numerical value as 5 as an example, the numerical value of the fifth bit of the codebook is fetched from the codebook and is stored as the numerical value of the second bit in the second array of md5_result_tmp, and so on, until the entire first array of md5_result_a is traversed, and the second array of md5_result_tmp is obtained accordingly.

In a step of S304, a second key used for the second character string in the plurality of character strings are determined according to the second array.

In some embodiments, the terminal device may encrypt the second array to obtain a third array, and perform the XOR operation on the first array according to the third array to obtain third key data. Then, the third key data is reordered to obtain fourth key data. The fourth key data may include a first key character string and a second key character string obtained by dividing according to a second target position. In this case, the second key character string is used as a key to encrypt the first key character string which is used as the plaintext, and thus a fifth key data may be obtained. Finally, an inverse operation is performed on a numerical value at a third preset position of the fifth key data to obtain the second key used for the second character string.

In particular, first, the terminal device may encrypt the second array based on a preset encryption algorithm to obtain the third array. For example, a MD5 operation is performed on the second array of md5_result_tmp to obtain the third array of md5_result_b.

Then, the first array is divided into a plurality of sub-arrays having the same length as the third array, and XOR operation is performed on each of the sub-arrays and the third array respectively to obtain the third key data. For example, an XOR operation is respectively performed on the high 16 bytes of the first array of md5_result_a and the third array of md5_result_b, and the low 16 bytes of the first array of md5_result_a and the third array of md5_result_b, to obtain the third key data of temporary_key (which has 32 bytes).

Then, the third subscript for reordering the third key data may be determined according to the obfuscated random number, and the character string(s) before the third subscript in the third key data is moved to the end of the third key data to obtain the fourth key data. For example, the result of summation of the high four bits of the obfuscated random number of mix_rng and the low four bits of the obfuscated random number of mix_rng is used as the subscript for reordering, the data before the subscript in the third key data is moved to the end of the third key data to obtain the fourth key data of aes_temporary (which has 32 bytes).

In this case, the fourth key data may be divided into two parts from the second target position, one part is used as the first key character string, and the other part is used as the second key character string. The second target position may be selected according to the actual situation, and is preferably an intermediate position of the fourth key data. For example, the high 16 bytes of the fourth key data of aes_temporary are used as plaintext content, and the low 16 bytes of the fourth key data of aes_temporary are used as the key used for advanced encryption standard (AES)-128 in electronic codebook (ECB) mode to obtain fifth key data of session_key (which has 16 bytes).

Finally, the inverse operation may be performed on the numerical value in the third preset position of the fifth key data to obtain the second key used for the second character string. The third preset position may be set according to the actual situation. For example, the inverse operation may be performed on the data having the subscripts of 0, 5, 8, 10 and 15 in the fifth key data of session_key to obtain a new array of new_session_key which is taken as the second key used for the second character string.

After the second key is obtained, a starting position of the second key may be determined according to the obfuscated random number, and XOR operation is performed on the numerical value at the starting position in the second key and the first byte of the second character string, and the XOR operation is performed on the numerical value at the next position of the starting position in the second key and the second byte in the second character string, and so on, until the encryption of the entire second character string has been completed. It should be understood that, if a length from the start position of the second key to the tail position of the second key is less than a length of the second character string, XOR operation is further performed on the first byte of the second key and the second character string after the tail position of the second key is reached.

The number of the initial position(s) may be one or plural.

In particular, the result of the summation of the high 4 bits and the low 4 bits of the obfuscated random number of mix_rng may be taken as the initial position of the second key of new_session_key, the initial position is used as the starting position for XOR operation, and XOR operation is performed on the second key of new_session_key and the second character string sequentially. If the length at the initial position is greater than the maximum length of the second key of new_session_key, the XOR operation is performed again from the beginning.

For example, if the obfuscated random number is mix_rng=0x46, the high 4 bits is start0=4, and the result of start1=10 is obtained by adding the high 4 bits with the low 4 bits. The first byte of the obtained encrypted subdata is the result obtained by performing XOR operation on the third byte of raw_data [2] (i.e. the first byte of the second character string) of the data to be encrypted and the fourth byte of the second key of new_session_key, and further performing XOR operation on the XOR operation result and the tenth byte of new_session_key of the second key of new_session_key. That is, the first byte of the obtained encrypted subdata is expressed as:

enc_data[2]=(raw_data[2]^new_session_key[4])^ new_session_key[10].

Correspondingly, the second byte of the obtained encrypted subdata is the result obtained by performing XOR operation on the fourth byte of raw_data[3] (i.e., the second byte of the second character string) of the data to be encrypted and the fifth byte of new_session_key[5] of the second key of new_session_key, and further performing XOR operation on the XOR operation result and the eleventh byte of new_session_key[11] of the second key of new_session_key. That is, the second byte of the obtained encrypted subdata is expressed as:

enc_data[3]=(raw_data[3]^ new_session_key[5])^ new_session_key[11].

Until the determination of the seventh byte of the encrypted subdata, the seventh byte of the encrypted subdata may be the result obtained by performing XOR operation on the ninth byte of raw_data[8] (i.e., the seventh byte of the second character string) of the data to be encrypted and the tenth byte of the new_session_key of the second key of new_session_key, and further performing XOR operation on the XOR operation result and the first byte of new_session_key[0] (i.e. starting from the beginning) of the second key of new_session_key. That is, the seventh byte of the encrypted subdata is expressed as:

enc_data[8]=(raw_data[8]^new_session_key[10])^ new_session_key[0].

And so on, the encrypted subdata corresponding to the second character string may be obtained.

According to the aforesaid method for data encryption, the keys used for the plurality of character strings may be used to encrypt the corresponding character strings to obtain the encrypted subdata corresponding to the plurality of character strings. For example, the first key may be used to encrypt the first character string to obtain the encrypted subdata corresponding to the first character string, and the second key may be used to encrypt the second character string to obtain the encrypted subdata corresponding to the second character string. In this case, the encrypted subdata of the initial random number and the target character string may be merged, and the merged data may be concatenated with the remaining encrypted subdata to obtain the target encrypted data. For example, the initial random number is merged into the encrypted subdata corresponding to the first character string (i.e., the first 2 bytes of the encrypted data). Then, the merged data is merged with the encrypted subdata corresponding to the second character string to obtain the target encrypted data after encryption.

Figure 4:
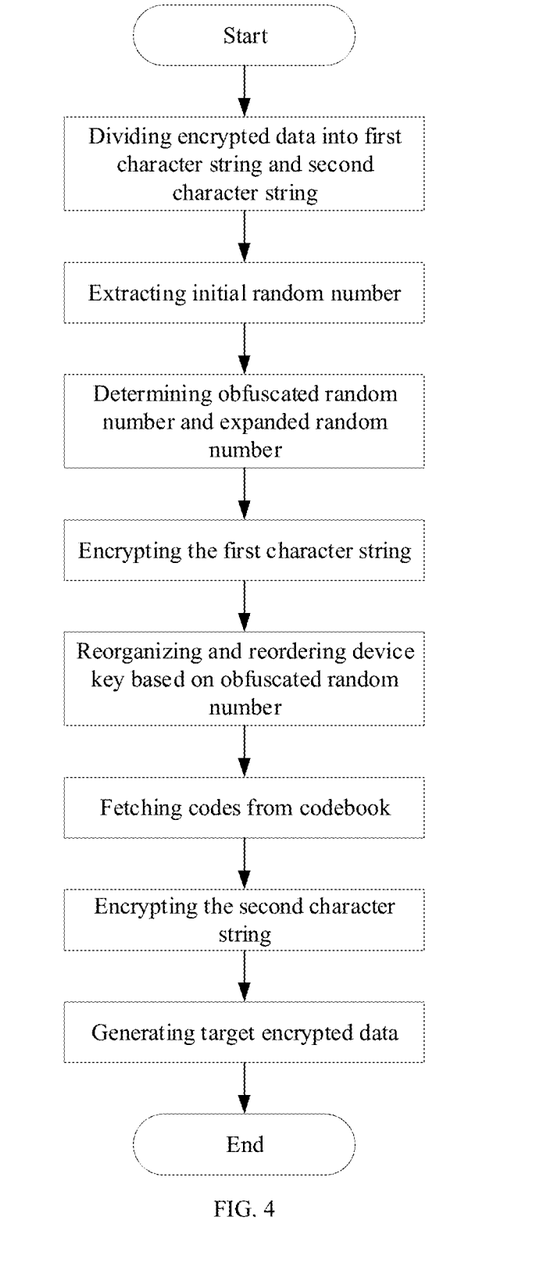
FIG. 4 illustrates a schematic flow diagram of a detailed implementation process of a method for data encryption in accordance with one embodiment of the present disclosure.

In order to facilitate understanding of the present disclosure, referring to FIG. 4, FIG. 4 illustrates a schematic flow diagram of a method for data encryption according to one embodiment of the present disclosure. First, data to be encrypted may be divided into a first character string and a second character string, then, an initial random number is extracted from the first character string, and an obfuscated random number and an extended random number are determined based on the initial random number. The extended random number is used as a first key, and the first character string is encrypted by the first key to obtain encrypted sub-data corresponding to the first character string. Then, based on reordering of the obfuscated random number and the ordering of the device key, codes are fetched from the codebook, a second key is determined based on fetched data, and the second character string is encrypted according to the second key to obtain encrypted sub-data corresponding to the second character string. Last, the encrypted sub-data corresponding to the first character string and the encrypted sub-data corresponding to the second character string are constituted as the target encrypted data.

According to the aforesaid method for data encryption, the security of the data to be encrypted is improved, and a possibility of acquisition of the data to be encrypted from the external is reduced.

It should be noted that, regarding the aforesaid method embodiments, for conciseness of description, all of the method embodiments are expressed as a combination of a plurality of steps. However, a person skilled in the art should understand that the present disclosure is not limited to the sequence of the steps described above, this is because that some steps in the method embodiments may be performed in a different sequence according to the present disclosure.

Figure 5:
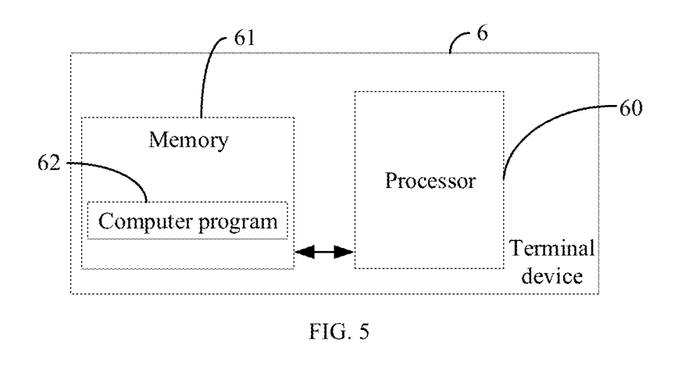
FIG. 5 illustrates a schematic structural diagram of a terminal device in accordance with one embodiment of the present disclosure.

As shown in FIG. 5, FIG. 5 illustrates a schematic diagram of a terminal device 6 in accordance with one embodiment of the present disclosure. The terminal device 6 may include a processor 60, a memory 61, and a computer program 62 stored in the memory 61 and executable on the processor 60, such as a data encryption program. When the processor 60 is configured to, when executing the computer program 62, implement the steps (e.g., the steps S101 to S104 shown in FIG. 1) in the various method embodiments for data encryption. The terminal device 6 may include, but is not limited to, a processor 60, the memory 61. A person of ordinary skill in the art can understand that, FIG. 6 is only one example of the terminal device 6, but should not be constituted as limitation to the terminal device. The terminal device 6 may include more or less components than the components shown in FIG. 6 or integrate some components or different components. For example, the terminal device 6 may also include an input and output (I/O) device, a network access device, a bus, etc.

The so-called processor 60 may be central processing unit (CPU), and can also be other general purpose processor, digital signal processor (DSP), application specific integrated circuit (ASIC), field-programmable gate array (FGPA), or some other programmable logic devices, discrete gate or transistor logic device, discrete hardware component, etc. The general purpose processor may be a microprocessor. As an alternative, the processor may also be any conventional processor, and the like.

The memory 61 may be an internal storage unit of the terminal device 6, such as a hard disk or a memory of the terminal device 6. The memory 61 may also be an external storage device of the terminal device 6, such as a plug-in hard disk, a SMC (Smart Media Card), a SD (Secure Digital) card, a FC (Flash Card) equipped on the terminal device 6. Furthermore, the memory 61 may not only include the internal storage unit of the terminal device 6 but also include the external memory of the terminal device 6. The memory 61 is configured to store the computer program, and other procedures and data required by the terminal device 6. The memory 61 may also be configured to store data that has been output or being ready to be output temporarily.

It needs to be noted that, for the convenience and conciseness of illustration, regarding the structure of the aforesaid terminal device 6, reference can be made to the specific descriptions of the structures in the method embodiments. The structure of the terminal device 6 is not repeatedly described herein.

In the aforesaid embodiments, the descriptions of the various embodiments are emphasized respectively, regarding a part of one embodiment which has not been described or disclosed in detail, reference can be made to relevant descriptions in other embodiments.

The foregoing embodiments are only intended to explain the technical solutions of the present disclosure, rather than limiting the technical solutions of the present disclosure. Although the present disclosure has been described in detail with reference to these embodiments, a person of ordinary skilled in the art should understand that, the technical solutions disclosed in the embodiments may also be amended, some technical features in the technical solutions may also be equivalently replaced. The amendments or the equivalent replacements don't cause the essence of the corresponding technical solutions to be deviated from the spirit and the scope of the technical solutions in the embodiments of the present disclosure, and thus should all be included in the protection scope of the present disclosure.

What is claimed is:

1. A method for data encryption implemented by a terminal device comprising a memory, a processor and a computer program stored in the memory and executable by the processor, the method comprising:
    obtaining data to be encrypted, wherein the data to be encrypted comprises a plurality of character strings obtained by dividing the data to be encrypted according to a first target position;
    extracting an initial random number from a target character string of the plurality of character strings;
    generating a plurality of keys used for the plurality of character strings according to the initial random number and a plurality of key generation strategies, wherein the plurality of character strings correspond to the plurality of key generation strategies, respectively; and
    using the plurality of keys used for the plurality of character strings to encrypt the plurality of character strings respectively to obtain target encrypted data,
    wherein the plurality of key generation strategies comprise a first key generation strategy, the first key generation strategy comprises:
    exchanging a numerical value at a first preset position in the initial random number with a numerical value at a second preset position in the initial random number to obtain an obfuscated random number; and
    selecting a preset number of bits from the obfuscated random number, and concatenating the number of bits selected from the obfuscated random number with the obfuscated random number to obtain a key used for a first character string in the plurality of character strings.

2. The method according to claim 1, wherein the plurality of key generation strategies comprise a second key generation strategy, the second key generation strategy comprises:
    exchanging a numerical value at a first preset position of the initial random number with a numerical value at a second preset position of the initial random number to obtain an obfuscated random number;
    determining a first array according to the obfuscated random number and a preset device key;
    taking numerical values at all positions of the first array as data-fetching-subscripts, and extracting data positioned on the data-fetching-subscripts from a preset codebook to obtain a second array; and
    determining a second key used for a second character string in the plurality of character strings according to the second array.

3. The method according to claim 2, wherein said determining the first array according to the obfuscated random number and the preset device key comprises:
    determining a first subscript for reordering the device key according to the obfuscated random number;
    moving one or a plurality of character string(s) positioned before the first subscript in the device key to a tail of the device key to obtain first key data;
    determining a second subscript and replacement data for performing data replacement operation on the first key data according to the obfuscated random number;
    replacing data positioned on the second subscript in the first key data with the replacement data to obtain second key data; and
    performing a hash algorithm on the second key data and the device key respectively, and determining the first array according to the second key data and a result of hash algorithm of the device key.

4. The method according to claim 2, wherein said determining the second key used for the second character string in the plurality of character strings according to the second array comprises:
    encrypting the second array to obtain a third array;
    performing an Exclusive OR (XOR) operation on the first array according to the third array to obtain third key data;
    reordering the third key data to obtain fourth key data, wherein the fourth key data comprises a first key character string and a second key character string obtained by dividing according to a second target position;
    using the second key character string as a key to encrypt the first key character string which is taken as a plaintext to obtain fifth key data; and
    performing an inverse operation on a numerical value positioned at a third preset position in the fifth key data to obtain the second key.

5. The method according to claim 2, wherein said using the plurality of keys used for the plurality of character strings to encrypt the plurality of character strings respectively comprises:
    exchanging the numerical value positioned at the first preset position of the initial random number with the numerical value positioned at the second preset position of the initial random number to obtain the obfuscated random number;
    determining a starting position of the second key according to the obfuscated random number; and
    performing an XOR operation on a numerical value positioned at the starting position in the second key and a first byte of the second character string, and performing the XOR operation on a numerical value positioned at a next position of the starting position in the second key and a second byte in the second character string, and so on, until encryption of entire second character string has been completed.

6. The method according to claim 1, wherein said using the plurality of keys used for the plurality of character strings to encrypt the plurality of character strings respectively to obtain the target encrypted data comprises:

using the plurality of keys used for the plurality of character strings to encrypt the plurality of character strings to obtain encrypted sub-data corresponding to the plurality of character strings; and merging the initial random number with the encrypted sub-data of the target character string, and concatenating merged data with the encrypted sub-data corresponding to the plurality of character strings from which the encrypted data of the target character string is excluded to obtain the target encrypted data.

7. A terminal device, comprising a memory, a processor and a computer program stored in the memory and executable by the processor, wherein the processor is configured to, when executing the computer program stored in the memory, implement steps of a method for data encryption, comprising:

obtaining data to be encrypted, wherein the data to be encrypted comprises a plurality of character strings obtained by dividing the data to be encrypted according to a first target position;

extracting an initial random number from a target character string of the plurality of character strings;

generating a plurality of keys used for the plurality of character strings according to the initial random number and a plurality of key generation strategies, wherein the plurality of character strings correspond to the plurality of key generation strategies, respectively; and encrypting the plurality of character strings by the plurality of keys used for the plurality of character strings respectively to obtain target encrypted data, wherein the plurality of key generation strategies comprise a first key generation strategy, the first key generation strategy comprises:

exchanging a numerical value at a first preset position in the initial random number with a numerical value at a second preset position in the initial random number to obtain an obfuscated random number; and selecting a preset number of bits from the obfuscated random number, and concatenating the number of bits selected from the obfuscated random number with the obfuscated random number to obtain a key used for a first character string in the plurality of character strings.

8. The terminal device according to claim 7, wherein the plurality of key generation strategies comprise a second key generation strategy, the second key generation strategy comprises:

exchanging a numerical value at a first preset position of the initial random number with a numerical value at a second preset position of the initial random number to obtain an obfuscated random number;

determining a first array according to the obfuscated random number and a preset device key;

taking numerical values at all positions of the first array as data-fetching-subscripts, and extracting data positioned on the data-fetching-subscripts from a preset codebook to obtain a second array; and determining a second key used for a second character string in the plurality of character strings according to the second array.

9. The terminal device according to claim 8, wherein the processor is further configured to determine the first array according to the obfuscated random number and the preset device key by:

determining a first subscript for reordering the device key according to the obfuscated random number;

moving one or a plurality of character string(s) positioned before the first subscript in the device key to a tail of the device key to obtain first key data;

determining a second subscript and replacement data for performing data replacement operation on the first key data according to the obfuscated random number;

replacing data positioned on the second subscript in the first key data with the replacement data to obtain second key data; and performing a hash algorithm on the second key data and the device key respectively, and determining the first array according to the second key data and a result of hash algorithm of the device key.

10. The terminal device according to claim 8, wherein the processor is further configured to determine the second key used for the second character string in the plurality of character strings according to the second array by:

encrypting the second array to obtain a third array;

performing an Exclusive OR (XOR) operation on the first array according to the third array to obtain third key data;

reordering the third key data to obtain fourth key data, wherein the fourth key data comprises a first key character string and a second key character string obtained by dividing according to a second target position;

using the second key character string as a key to encrypt the first key character string which is taken as a plaintext to obtain fifth key data; and performing an inverse operation on a numerical value positioned at a third preset position in the fifth key data to obtain the second key.

11. The terminal device according to claim 8, wherein the processor is further configured to use the plurality of keys used for the plurality of character strings to encrypt the plurality of character strings respectively by:

exchanging the numerical value positioned at the first preset position of the initial random number with the numerical value positioned at the second preset position of the initial random number to obtain the obfuscated random number;

determining a starting position of the second key according to the obfuscated random number; and performing an XOR operation on a numerical value positioned at the starting position in the second key and a first byte of the second character string, and performing the XOR operation on a numerical value positioned at a next position of the starting position in the second key and a second byte in the second character string, and so on, until encryption of entire second character string has been completed.

12. The terminal device according to claim 7, wherein the processor is further configured to use the plurality of keys used for the plurality of character strings to encrypt the plurality of character strings respectively to obtain the target encrypted data by:

using the plurality of keys used for the plurality of character strings to encrypt the plurality of character strings to obtain encrypted sub-data corresponding to the plurality of character strings; and merging the initial random number with the encrypted sub-data of the target character string, and concatenating merged data with the encrypted sub-data corresponding to the plurality of character strings from which the encrypted data of the target character string is excluded to obtain the target encrypted data.

13. A non-transitory computer-readable storage medium, which stores a computer program, that, when executed by a processor of a terminal device, causes the processor of the terminal device to implement steps of a method for data encryption, comprising:
   obtaining data to be encrypted, wherein the data to be encrypted comprises a plurality of character strings obtained by dividing the data to be encrypted according to a first target position;
   extracting an initial random number from a target character string of the plurality of character strings;
   generating a plurality of keys used for the plurality of character strings according to the initial random number and a plurality of key generation strategies, wherein the plurality of character strings correspond to the plurality of key generation strategies, respectively; and
   using the plurality of keys used for the plurality of character strings to encrypt the plurality of character strings respectively to obtain target encrypted data,
   wherein the plurality of key generation strategies comprise a first key generation strategy, the first key generation strategy comprises:
   exchanging a numerical value at a first preset position in the initial random number with a numerical value at a second preset position in the initial random number to obtain an obfuscated random number; and
   selecting a preset number of bits from the obfuscated random number, and concatenating the number of bits selected from the obfuscated random number with the obfuscated random number to obtain a key used for a first character string in the plurality of character strings.

* * * * *